Jan. 22, 1935. W. B. STOUT 1,988,671
AUTOMOBILE
Filed April 27, 1932 4 Sheets-Sheet 3

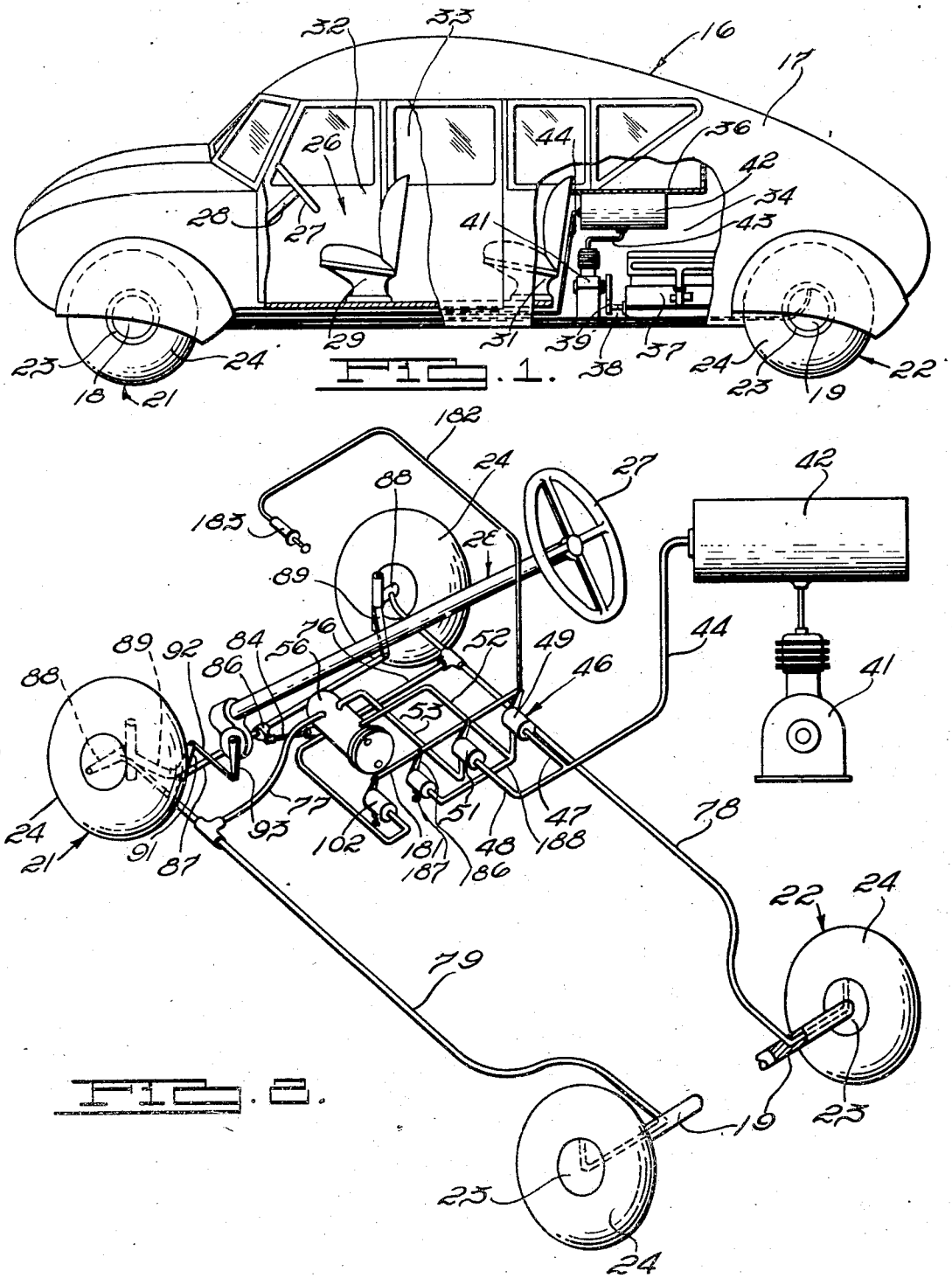

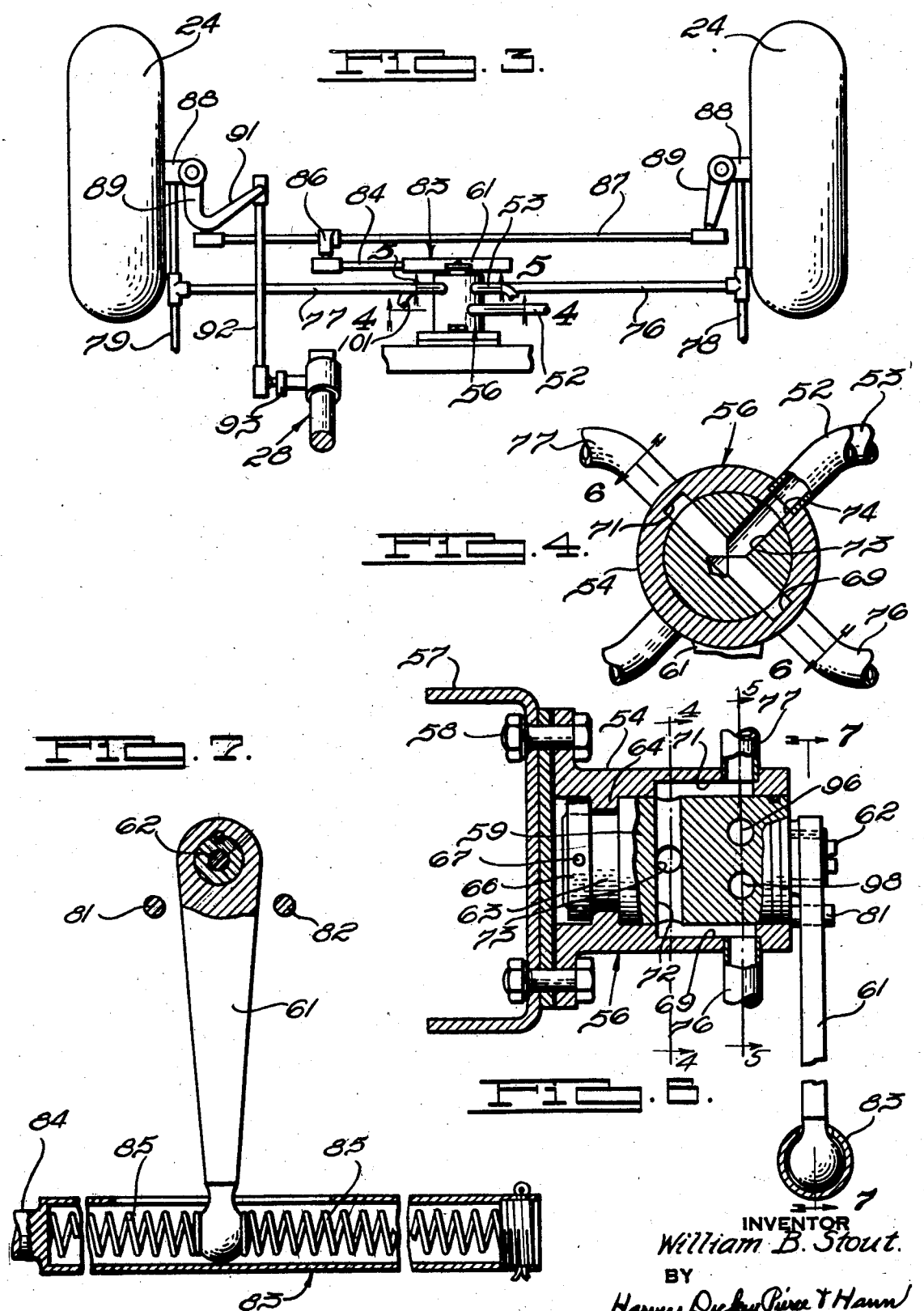

INVENTOR
William B. Stout.
BY
Harness Dickey Pierce & Haun
ATTORNEYS

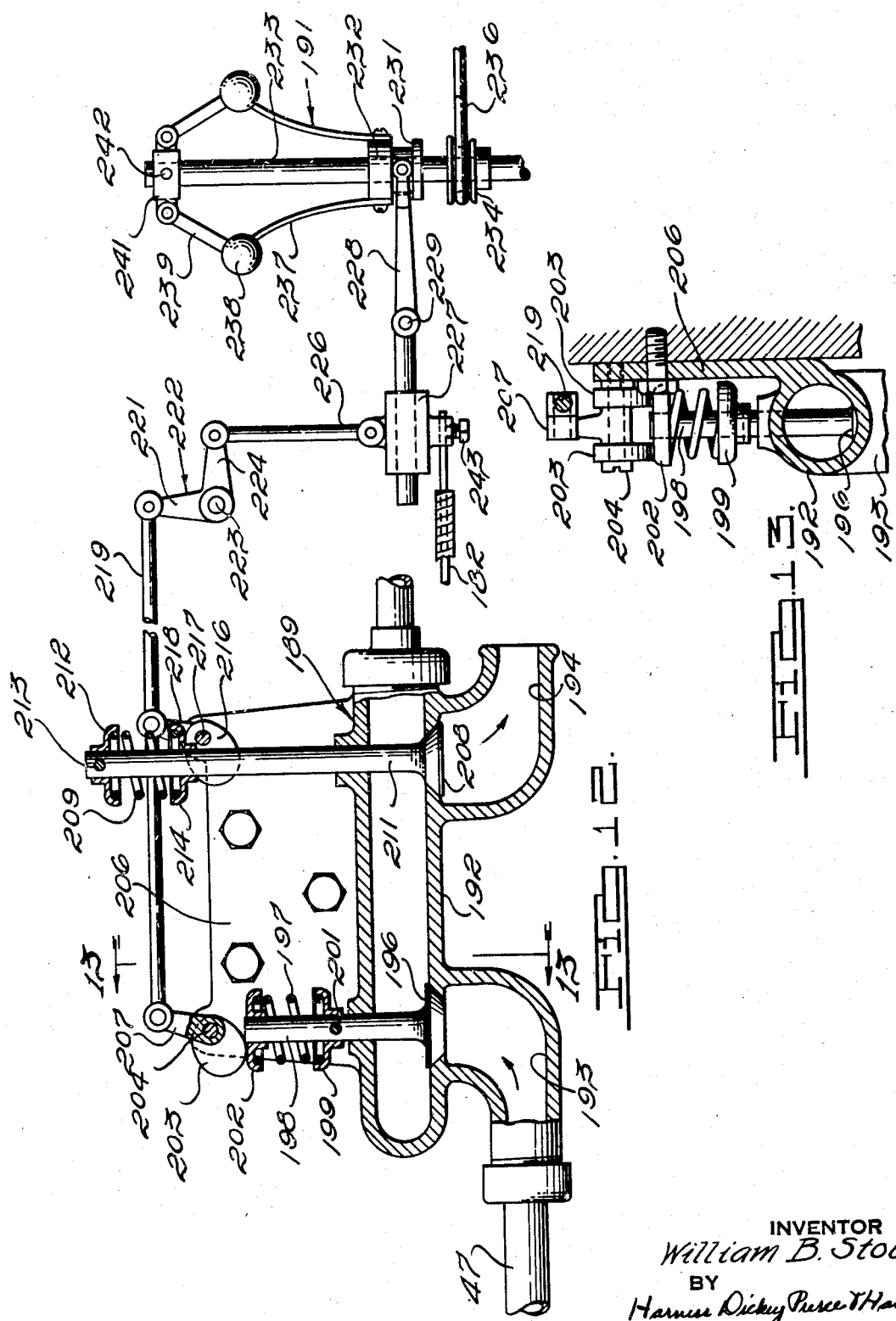

Patented Jan. 22, 1935

1,988,671

UNITED STATES PATENT OFFICE 1,988,671

AUTOMOBILE

William B. Stout, Detroit, Mich.

Application April 27, 1932, Serial No. 607,812

15 Claims. (Cl. 152—11)

This invention relates to motor vehicles and particularly to devices for changing the air pressure in the tires of such vehicles whenever a different pressure in one or more of the tires is desirable.

Objects of the invention include the provision of mechanism for varying the inflation of pressure in vehicle tires in accordance with conditions of vehicle operation whereby to enable a vehicle operator to obtain, under any such conditions and while the vehicle is in motion, pressures in the tires which are best suited for vehicle operation; the provision of means for automatically varying the pressure in the tires of a motor vehicle in response to the vehicle speed; the provision of means under the direct control of the vehicle operator for changing the pressure of the tires of a vehicle at will; the provision of means for enabling the tire pressure of a motor vehicle to be varied either manually by the operator thereof, or automatically in response to operating conditions; the provision of both manual and automatic means for controlling the pressure of all or less than all of the tires of a vehicle during operation of the vehicle; the provision of means for automatically varying the pressure in the tires of a motor vehicle through operation of the steering means therefor; the provision of automatic means for increasing the air pressure in the tires on the outside of a motor vehicle when the motor vehicle is turning a curve in a road and thereafter to equalize the pressure in all the tires when the vehicle is returned to a straight path of movement; and the provision of valvular means of novel formation operatively connected to the steering means of a motor vehicle.

The above being among the objects of the present invention, the same consists of certain novel features of construction and combinations of parts to be hereinafter described with reference to the accompanying drawings and then claimed, having the above and other objects in view.

The operation of the ported valve is controlled by a connection with the steering wheel in such manner that when rounding a curve in one direction the tires upon the outside of the curve are connected with the higher limit pressure reducing valve, while those upon the inside of the curve are connected to the exhaust pressure reducing valve. When the steering mechanism is operated for turning the car in the opposite direction, the opposite tires are connected with the higher limit pressure reducing valve and the exhaust pressure reducing valve in such manner as to reverse the pressure condition in the tires. In each instance when a curve has been rounded and the vehicle again proceeds upon a straight portion of the road therebeyond, the steering mechanism so operates the ported valve that all of the tires are again connected to the normal or intermediate pressure reducing valve which maintains the tires during this operating condition at the pressure at which such valve is adjusted to discharge air from the air supply tank. Both the higher, the intermediate and the two exhaust pressure reducing valves are connected for adjustment as a unit so that the pressures at which all of the valves discharge can be proportionally increased or decreased simultaneously and either manually or in response to vehicle speed.

For a better understanding of the invention, reference may be had to the accompanying drawings forming a part of this specification, in which:

Figure 1 is a side elevational view of the motor vehicle embracing the principles of the invention and having parts thereof broken away for the purpose of more clearly illustrating the interior thereof;

Fig. 2 is a diagrammatical view of the wheels, axles and steering mechanism of a motor vehicle equipped with a tire pressure controlling mechanism embracing the principles of the invention;

Fig. 3 is a fragmentary plan view illustrating the front portion of a motor vehicle having a tire pressure controlling mechanism embracing the principles of the invention;

Fig. 4 is a transverse sectional view through the ported valve mechanism embraced in the structure illustrated by Fig. 3 and is taken substantially on line 4—4 of both Figs. 3 and 6 looking in the direction of the arrows;

Figure 5:
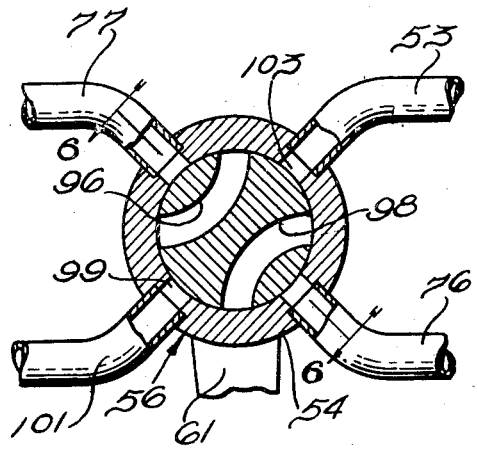
Figure 8:
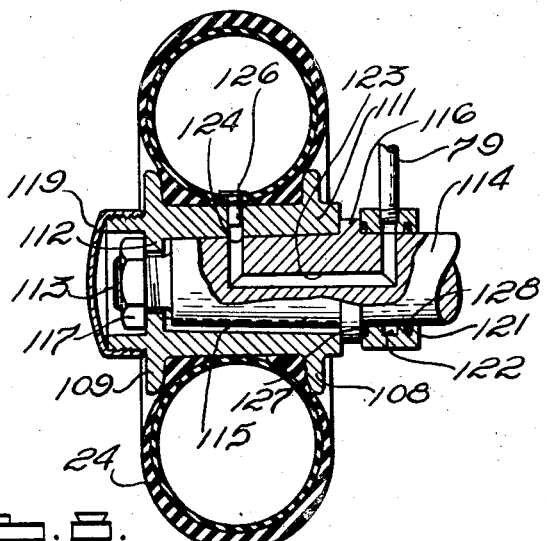
Figure 9:
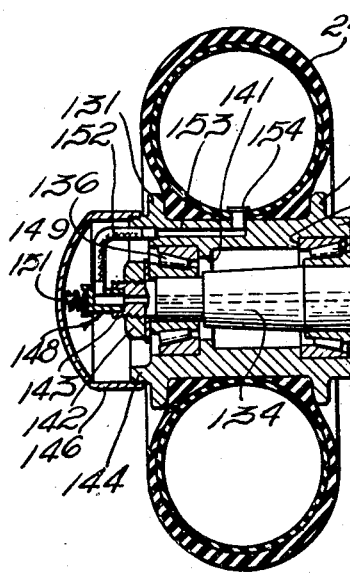
Figure 10:
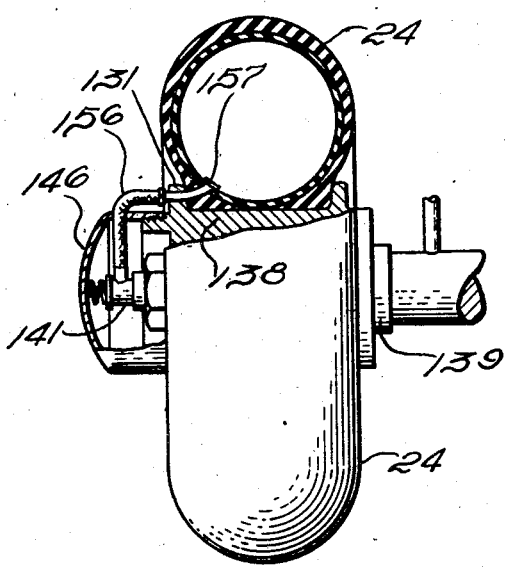

Fig. 5 also is a transverse sectional view through the ported valve mechanism except that the latter is taken substantially on line 5—5 of Figs. 3 and 6 looking in the direction of the arrows;

Fig. 6 is a longitudinal sectional view through the ported valve mechanism and is taken substantially on line 6—6 in Figs. 4 and 5;

Fig. 7 is a fragmentary sectional and elevational view of the pressure controlling mechanism at it might appear on line 7—7 of Fig. 6 and looking in the direction of the arrows thereon;

Fig. 8 is a cross-sectional view through one of the rear wheels of the motor vehicle illustrated by Figs. 1 and 2;

Fig. 9 is a cross-sectional view through one of the front wheels of the aforesaid motor vehicle;

Fig. 10 is a view partly in cross section and partly in elevation of another form of wheel which may be employed in practicing the invention.

Figure 11:
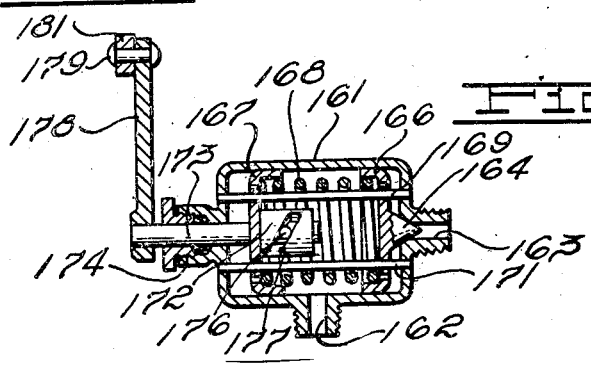

Fig. 11 is a longitudinal sectional view through one of the pressure reducing valves embraced in the pressure controlling mechanism.

Fig. 12 is a view partly in elevation and partly in cross section, illustrating a modified form of structure embracing the invention.

Fig. 13 is a cross-sectional view taken substantially on line 13—13 of Fig. 12.

In the embodiment of the invention disclosed herein for the purpose of illustration, a motor vehicle having an engine for effecting the operation thereof also is provided with an air compressor driven automatically by the engine for maintaining, at substantially all times during the operation of the vehicle, a predetermined maximum pressure in an air supply tank into which the compressor discharges. This supply tank is connected to a pair of pressure reducing valves, one for supplying air at a pressure desirable for the normal operation of the vehicle and the other for supplying air when it is desirable to increase the pressure in the tires on one side of the vehicle above normal operating pressure. These valves are independently connected to a ported valve which in turn is connected to all of the tires of the vehicle and by separate conduits to the tires on the opposite side thereof. A discharge port from the valve is connected to an exhaust pressure reducing valve which limits the extent to which air can be discharged below normal operating pressure from any of the tires; and a similar exhaust pressure reducing valve is connected between the ported valve and the pressure reducing valve normally supplying air for the normal operation of the vehicle.

The operation of the ported valve is controlled by a connection with the steering wheel in such manner that when rounding a curve in one direction the tires upon the outside of the curve are connected with the higher limit pressure reducing valve, while those upon the inside of the curve are connected to the exhaust pressure reducing valve. When the steering mechanism is operated for turning the car in the opposite direction, the opposite tires are connected with the higher limit pressure reducing valve and the exhaust pressure reducing valve in such manner as to reverse the pressure condition in the tires. In each instance when a curve has been rounded and the vehicle again proceeds upon a straight portion of the road therebeyond, the steering mechanism so operates the ported valve that all of the tires are again connected to the normal or intermediate pressure reducing valve which maintains the tires during this operating condition at the pressure at which such valve is adjusted to discharge air from the air supply tank. Both the higher, the intermediate and the two exhaust pressure reducing valves are connected for adjustment as a unit so that the pressures at which all of the valves discharge can be proportionally increased or decreased simultaneously and either manually or in response to vehicle speed.

Referring particularly to Figs. 1 and 2, the motor vehicle 16, embracing the invention, comprises a stream lined body 17 having front and rear axles 18 and 19 supporting pairs of wheels 21 and 22 respectively, and each consisting of a small detachably mounted hub 23 on which is mounted a large and flexible pneumatic tire 24 adapted to be inflated to a relatively low unit pressure.

The body 17 includes a passenger compartment 26 having projecting therein a steering wheel 27 of a steering mechanism 28 by which the angular position of the front vehicle wheels 21 is controlled. The passenger compartment 26 contains front and rear seats 29 and 31 respectively accessible through front and rear doors 32 and 33 arranged in pairs on opposite sides of the body. Behind the passenger compartment 26 is an engine compartment 34 separated from the passenger compartment by a partition 36 and beneath a portion of which is arranged an engine 37 for driving the rear vehicle wheels 22 through appropriate mechanism within the rear axle 19.

A shaft 38 projecting forwardly of the engine 37 is operatively associated with driving mechanism 39 by which an air compressor 41, arranged in the engine compartment 34 in front of the engine 37, is driven. A supply tank 42 secured to the partition 37 receives compressed air through a conduit 43 from the discharge side of the compressor 41 and discharges such air, when required, through a conduit 44 to a tire pressure controlling mechanism 46, by which the pressure maintained in the tires 24 is automatically and manually controlled.

In order to maintain a predetermined and constant high air pressure in the tank 42, the driving mechanism 39 for the compressor may embrace a suitable friction clutch controlled by the air pressure in the tank 42 or any other well known mechanism for accomplishing such results may be employed. The air supplying conduit 44, through branch conduits 47 and 48, communicates with pressure reducing valves 49 and 51 respectively, the first for supplying air to the system at a predetermined normal or intermediate pressure and the second for supplying air to the system at a predetermined high pressure. The air at such different pressures is conducted from the valves 49 and 51 by conduits 52 and 53, respectively, to a pressure controlling valve 56.

This valve, which is shown in greater detail in Figs. 3 to 7 inclusive, is secured to a frame portion 57 of the body 17 by bolts 58 and includes a casing 54 which encloses a rotatable controlling member 59, the angular position of which is determined by the position of an arm 61 secured rigidly to the rotatable element.

The arm 61 is limited in its maximum movement in either direction from its central position by a pair of stops 81 and 82 projecting from the front of the casing 54 and into the path of movement of the arm 61. The free end of the arm 61 is formed into a ball so as to form a part of the ball and socket joint 83 in which it is embraced by a pair of oppositely disposed coil springs 85. This ball and socket joint 83 is connected by a rod 84 and bracket 86 to the tie rod 87 of the vehicle steering mechanism 28. The usual spindles 88 upon which the front wheels 21 are rotatably mounted are provided with the usual arms 89 projecting therefrom to the free ends of which the opposite ends of the tie rod 87 are connected. One of the arms 89 is extended as in 91 and its free end is connected by a drag link 92 with the steering arm 93 of the steering gear, it being understood that the position of the steering arm 93 is controlled through operation of the steering wheel 27 in accordance with conventional practice. When the front wheels 21 are not deflected appreciably from one side to another by operation of the steering wheel 27, the lever 61 occupies a position midway between the stops 81 and 82, but when the steering wheel 27 is turned an appreciable amount in either direction, causing a corresponding movement of the tie rod 87, the lever 61 is caused to swing in a corresponding direction against either the stop 81 or the stop 82 according to the direction of rotation of the steering wheel and thus moves the valve mechanism 56 into one of its operative positions which will now be described.

Referring now to Figs. 2 to 6 inclusive and particularly to Figs. 4, 5 and 6, it will be noted that in order to prevent dislocation of the rotatable element 59 from the casing 54 of the valve mechanism 56, the rotatable element 59 is provided with a reduced inner end 63, abutting an annular shoulder formed on the casing 54, and which in turn is abutted by an annular ring 66 rigidly secured to the reduced end 63 by a set screw 67.

Provided in the inner surface of the casing 54 and disposed diametrically across the casing relative to one another is a pair of longitudinally disposed ports 69 and 71, the corresponding inner ends of which are adapted to communicate with a transversely disposed port 72, formed in the rotatable element 59, whenever the arm 61 is disposed in approximately its normal intermediate position. The central portion of the port 72 communicates through a port 73 formed in the rotatable element with a port 74 formed in the casing 54 and in communication with which the conduit 52 from the low pressure reduction valve 49 is secured. The opposite ends of the ports 69 and 71 communicate with the ends of conduits 66 and 67, secured in the casing 54 in such regions, and the opposite ends of which conduits communicate through conduits 78 and 79, respectively, with the tire casings 24 of the wheels on opposite sides of the vehicle.

Thus, when the vehicle is being driven along a straight road, a normal and relatively low pressure is maintained in all of the tires thereof by reason of the open communication thereof with the pressure reducing valve 49, through the ports 73 and 72 in the rotatable element 59 of the valve and the ports 69 and 71 in the casing 54.

Also formed in the valve element 59 and directly in front of the port 72 is a pair of oppositely disposed arcuate ports 96 and 98 which are so disposed in the valve element as to be bisected by a plane longitudinally intersecting the axis of the valve element and also intersecting the longitudinal axis of the port 72. When the port 72 communicates with the ports 71 and 69 the ports 96 and 98 are entirely closed by portions of the casing 54 on opposite sides of the conduits 76 and 77. Connected to a port 99, communicating with the casing 54 on one side thereof and midway between the conduits 76 and 77, is a conduit 101 the opposite end of which communicates with an exhaust pressure reduction valve 102 similar to the reduction valves 49 and 51 and adapted to discharge air to the atmosphere until the pressure has been reduced to a predetermined low value. Diametrically opposite the port 99 communicating with the conduit 101 is a port 103 which communicates with the heretofore mentioned conduit 53 communicating with the high pressure reduction valve 51.

Whenever the steering mechanism 28 is operated to turn the front wheels 21 in either direction until the port 72 ceases to communicate with either of the ports 69 or 71, the further movement of the steering mechanism moves the ports 96 and 98 into a position in which one end or the other of each port communicates with the conduits 77 and 76 respectively while the opposite ends thereof communicate with one or the other of the conduits 101 or 53 through the ports 99 or 103. For example, if the front wheels are turned in such manner as to turn the vehicle to the right, the port 96 is moved until one end thereof communicates with the conduit 77 while the opposite end thereof communicates with the conduit 53. Simultaneously therewith the port 98 is moved until one end communicates with the conduit 76 while the opposite end communicates with the conduit 101. Under such circumstances air at a higher pressure than that normally contained in the tires is discharged from the conduit 53 through the port 96, the conduit 77, the conduit 79 and into the front and rear tires on the left hand side of the vehicle.

The discharge of air at such higher pressure into these tires increases the resistance thereof to the increased load carried thereby during the movement of a vehicle around a curve in the road to the right and consequently this side of the car is held in its normal position until the wheels are straightened and the port 96 is moved out of communication with the conduits 53 and 57. Simultaneously therewith the port 98 also provides a communication between the conduits 76 and 71 in which event air flows out of the tires through the conduit 76, the port 98, the conduit 101 and the exhaust pressure reduction valve 102 until the pressure is decreased a sufficient amount below the normal value thereof and at which pressure the valve 102 is adjusted to close.

Under such circumstances the pressure in the tires on the inside of the curve will be decreased below the value at which said tires normally are inflated but such reduced pressure is sufficient to maintain the inside of the vehicle in its normal relation because this side of the car exerts a less than normal force upon the tires. When the wheels are straightened the port 98 moves out of communication with the conduits 101 and 76 and immediately thereafter the port 72 communicates with the conduits 76 and 77 through the ports 69 and 71 respectively, in which event the air from the excessively inflated tires on the left hand side of the vehicle flows out of the conduit 77, through the ports 71, 72 and 69, into the conduit 76 and thence to the under inflated tires on the right hand side of the car. In the event the pressures in all of the tires become equalized at a value less than the normal operating pressure required therein, the pressure reduction valve 49 discharges air into all of the tires from the port 73 until the required pressure is again established.

In turning a left hand curve the valve element 59 is rotated in the opposite direction until the port 96 communicates with the conduits 77 and 101, in which event the air from the tires on the left hand side of the vehicle is exhausted through the exhaust pressure reduction valve until the pressure reaches a predetermined minimum value and at the same time, the port 98 provides communication between the conduits 53 and 76 which increases the pressure in the tires on the right hand side of the car by air discharge from the high pressure reduction valve 51. When the car thereafter is driven upon a straight road the pressure in all of the tires is equalized as heretofore has been described.

In the structure disclosed by Fig. 8, representing one of the rear wheels of the vehicle, the tire 24 is removably secured between a spaced pair of flanges 108 and 109 projecting outwardly from the exterior surface of a cylindrical sleeve or hub 111. This hub has an inwardly projecting flange 112 adjacent the outer extremity thereof which is adapted to receive the reduced and threaded end 113 of a driven axle 114 in turn having an outwardly projecting flange 116 engaging the inner extremity of the hub 111. The relative rotation of the axle and hub is prevented by a key 115. The flange 116 is tightened against the inner extremity of the hub, for holding the wheel firmly in position upon the axle, by the application of a nut 117 engaging the reduced and threaded end 113. The outer end of the hub 111 has projecting therefrom, around the nut 117, an externally threaded annular extension 118 upon which a cap 119 is removably secured. Inwardly of the flanges 116 of each of the rear wheels and rotatably disposed upon the axle 114 are annular sealing rings 121 to which the rear ends of the conduits 78 and 79 are secured. Formed on the inner surface of each sealing ring 121 and midway between the opposite end extremities thereof is an annular port 122 with which one or the other of the conduits 78 and 79 always is in open communication and which also communicates with one end of a port 123 extending longitudinally of the axle and inwardly of the hub 111. The opposite end of the port 123 communicates with a port 124 extending radially through the hub 126 and which in turn communicates with the interior of one of the tires 24 through an open stem 126. In order to prevent the escape of air from the annular port 122, there are formed on opposite sides of the latter, annular grooves 127 and 128 in which expansible packing material normally is compressed.

In the structure disclosed by Fig. 9, representing one of the front wheels 21 of the vehicle, the tire casing 24 likewise is mounted between a pair of annular flanges 131 and 132 projecting outwardly from adjacent the opposite end of a hub 133. This hub is rotatably mounted upon a relatively stationary spindle 134 by roller bearings 136 and 137 disposed at the outer and inner extremities of the hub and spindle respectively.

The bearing 137 is secured in the hub 133 against an annular shoulder 138 formed therein and upon the spindle 134 against an annular shoulder 139 projecting outwardly from the spindle adjacent the inner extremity of the hub. The outer bearing 136 is secured in the hub 133 against an inwardly disposed annular shoulder 141 at the inner extremity of the bearing and at the outer extremity thereof by a nut 142 threaded thereagainst upon a reduced end 143 of the spindle projecting outwardly therethrough. Surrounding the nut 142 and projecting outwardly from the hub 133 is an externally threaded annular flange 144 on which a hub cap 146 is removably secured.

In order to supply and to exhaust air from the tires 24 of the front wheels the front ends of the conduits 78 and 79 are connected to the spindles 134 on opposite sides of the vehicle and in communication with ports 147 extending through the spindles to the outer extremities thereof. Each of these ports communicates with a swivel connection 148 consisting of a rotatable sleeve 149 having one end rotatably disposed in an opening formed in the outer extremity of the reduced end 143 and held in position by a spring 151 abutting the outer end of the sleeve and the inner surface of the cap 146. The interiors of the sleeves 149 are connected by conduits 152 with ports 153 formed in each hub 133 and the inner extremities of which communicate with the interiors of the tires 24 through open stems 154.

In the structure disclosed by Fig. 8 the rotatable swivel sleeve 149 is connected to one end of a conduit 156 extending outwardly through the cap 146 and communicating with the interior of the tire 24 through a stem 157 extending through the side of the tire 24 and an opening through the outer flange 131.

While the pressure reduction valves 49, 51 and 102 may be of any desired construction, as illustrated by Fig. 11, they each comprise a casing 161 having a discharge orifice 162 in one side and an inlet orifice 163 in an end thereof, the latter of the two being controlled by a valve 164 mounted upon a piston 166 slidably disposed in the interior of the cylinder. Disposed adjacent the opposite end of the cylinder is a second slidably disposed piston 167 and compressed between the two pistons is a spring 168 adapted resiliently to hold the valve 164 within the inlet orifice 163. The two pistons have openings therein permitting the free movement of air throughout the casing and are slidably disposed to prevent rotation thereof upon guide rods 169 and 171 mounted longitudinally of the casing 161 and with the opposite ends thereof secured rigidly therein.

In order to be able to adjust the compression of the spring 168, the piston 167 is provided with an axially disposed sleeve 172 which is slidably and rotatably mounted upon a rotatable rod 173 projecting inwardly of the casing through a packing gland 174. A portion of the rod within the sleeve 172 has a pin 176 projecting therefrom which slidably engages a diagonal slot 177 formed in the sleeve for moving the piston 176 toward and away from the piston 166 when the rod 173 is rotated.

To provide means for rotating the rod 173, the outer end of the latter is secured rigidly to an arm 178 and all of the arms 178 of the valves 49, 51 and 102 are secured by pins 179 to a bar 181 by which the springs of all of the valves may be varied simultaneously. The bar 181 is manipulated from the passenger compartment 32 of the vehicle by any suitable operating mechanism as, for example, the wire 182 operated by a push button 183 and disposed slidably within a flexible sheath or casing 183 secured within the passenger compartment to the dash or other convenient part of the vehicle body.

When the button 183 is moved either inwardly or outwardly the springs 168 of all of the valves 49, 51 and 102 are simultaneously either further compressed or released in order either to increase or decrease the resistance to the opening movement of the valves 164 and which results either in an increase or a decrease in the pressure of the air discharged from the pressure reduction valves.

Also secured to the bar 181 and operable thereby is an arm 186 of an exhaust pressure reducing valve 187 which is connected by a conduit 188 to the conduit 52 employed in connecting the normal pressure reducing valve 49 to the ported valve 56 and therefrom to the tires 24. This valve is set to discharge air to the atmosphere from all of the tires at a pressure always somewhat in excess of the pressure at which air is discharged from the valve 49.

In the structure disclosed by Figures 12 and 13 the function of the two valves 49 and 187 is performed by a unitary pressure reduction valve element 189 which is controllable either manually by the operation of the wire 182 or automatically by a vehicle speed responsive governor 191. The valve may be employed in place of the valves 49 and 187, either with the manual or the speed controlling means, or as illustrated, with both such controls.

The valve element 189 comprises essentially a casing 192 having an air inlet passage 193 connected to the air supplying conduit 47 and an air outlet passage 194 connected with the atmosphere. The casing interior also is connected by the conduit 52 to the vehicle tires 24 either directly or through the ported valve 56 as illustrated.

The inlet passage is controlled by an inwardly opening valve 196 which normally is held closed by a compression spring 197 surrounding the stem 198 of the valve and resting at one end upon a flanged washer 199 secured to the stem 198 by a pin 201. The opposite end of the spring is held in position by a washer 202 which is engaged and held in variable position by a pair of cams 203. The cams are journaled upon a pin 204 extending from a support 206 for the casing 192 and are secured rigidly together by an operating arm 207 also journaled on the pin 204.

The outlet passage 194 is controlled by an outwardly opening valve 208 having a spring 209 surrounding its stem 211 and supported upon a flanged washer 212 secured by a pin 213 to the stem 211 for holding the valve normally closed against the pressure in the casing 192. The spring 209 at its opposite end rests upon a washer 214 slidably disposed upon the stem 211 and in turn supported in variable positions upon a pair of cams 216. A pin 217 projecting from the support 206 rotatably supports the cam 216 and these in turn are held in position and operated by an arm 218 secured rigidly thereto.

The cams and springs controlling the valve 196 and 208 are so arranged that rotation of the cams in the same direction tends to increase or decrease proportionally the pressures at which the valves will open under the pressures affecting them. The springs 196 and 209 are so adjusted that the valve 208 will discharge air to the atmosphere only at a pressure always slightly greater than the pressure at which the valve 196 will close.

The arms 207 and 218, controlling the cams 203 and 216 respectively, are pivotally connected to a rod 219 which in turn is pivotally connected to an arm 221 of a lever 222 having an intermediate portion thereof mounted for oscillating movement upon a pin 223. The other arm 224 of the lever 222 is pivotally connected to a rod 226 which likewise is connected to a weight 227 slidably mounted upon one end of a lever 228. A pin 229 pivotally supports the lever 228 intermediate the ends thereof. The opposite end of the lever 228 has a yoke formed therein which runs in a circumferential groove 231 formed in a collar 232 slidably mounted upon a shaft 233 of the governor 191. A pulley 234 driven by a belt 236 may be employed for driving the governor 191 in proportion to the speed of the vehicle.

The collar 232 has secured thereto a pair of springs 237 supporting balls 238 supported by rods 239 which in turn are pivotally secured to a block 241 fastened to the governor shaft 233 by a pin 242.

The springs 237 tend to hold the balls 238 inwardly and to urge the collar 232 downwardly. The weight 227 tends to move the balls and the collar in the opposite direction and the position of the weight upon the lever 228 determines the magnitude of this tendency. In order to be able to vary the position of the weight 227 upon the lever 228 the former is connected by a screw 243 to the wire 182 which is manually controllable by the vehicle operator.

In the operation of the apparatus it is necessary to predetermine, the pressure at which the tires normally should all be inflated for sustaining the movement of the vehicle upon a straight road, the pressure at which the tires on the outside of the vehicle should be maintained during the turning of a curve and also the pressure at which the tires on the inside of the vehicle should be maintained during the turning of a curve. When such pressures have been determined either by experiment or otherwise, the pressure reduction valve 46 is originally set to discharge air through the ported valve 84 and into all of the vehicle tires at a pressure at which it has been found desirable to operate all of the tires during the movement of the vehicle upon a straight road. The valve 51 is likewise adjusted to discharge air at the pressure at which it has been found desirable to maintain the tires on the outside of a vehicle during the turning of a curve and the valve 102 likewise is set to discharge air at the pressure at which it has been found desirable to maintain the tires on the inside of the vehicle during the turning of a curve.

During the operation of the vehicle should it be found that the pressures at which all of the pressure reduction valves 49, 51, 102 and 187 are set to discharge air, are too high for the conditions of operation prevailing at the time, all such pressures may be proportionally increased by manipulating the button 183 and the rod 181. Likewise, if all of the pressures are found to be too low such condition may be corrected by so manipulating the button 183 as to move the bar 181 in the opposite direction.

When the vehicle is being driven upon a straight road air is supplied to all of the tires from the valve 49 at a predetermined intermediate pressure. When turning a curve in either direction the tires on the outside of the vehicle are supplied with air at a predetermined maximum pressure by the valve 51 and on the inside a predetermined minimum pressure is maintained by the operation of the exhaust valve 102. Whether the air is supplied to all of the tires or to the tires on one side or the other of the vehicle is determined by the automatic operation of the ported valve 56 under the influence of the operation of the steering mechanism 28.

When the speed controlled apparatus disclosed by Figures 12 and 13 is employed, the governor 191, through the operating mechanism associated therewith, will automatically adjust the springs of the valves 96 and 208 to maintain a predetermined pressure in the tires depending upon the vehicle speed. When the speed is increased, for example, the operation of the governor will decrease the compression of the spring 197 to permit more air to flow into the tires and at the same time will proportionally increase the compression of the spring 209 to prevent such air from being discharged to the atmosphere. If the speed is decreased the compression of the spring 209 will be decreased to permit the discharge to the atmosphere of some of the air in the tires 24 and simultaneously the compression of the spring 197 will be increased to prevent discharge of more air at such reduced pressure through the valve 196.

Any of the tire pressure controlling and varying mechanism disclosed in combination herein may be employed as separate and independently operative devices to control pressures in any number of the tires of different vehicles.

While the structure as herein disclosed constitutes a preferred form and application of the invention, it is to be understood that the structure is merely illustrative of the invention and that numerous other modified and equivalent structures are within the scope of the invention as defined by the appended claims.

What is claimed is,

1. A motor vehicle comprising a body supported by a plurality of pneumatic tires, a steering mechanism for said vehicle and means responsive to the operation of said steering mechanism for controlling the inflation pressures of said pneumatic tires.

2. A motor vehicle comprising a body supported by a plurality of pneumatic wheels, means for maintaining a predetermined inflation pressure in said wheels when said vehicle is moving in a substantially straight forward path and means for maintaining a different inflation pressure in said pneumatic wheels when at least a portion of said wheels are turned to cause said vehicle to move in a curved path.

3. A motor vehicle comprising a body supported by a plurality of pneumatic wheels, certain of said wheels being angularly movable relative to the other for changing the course of movement of said vehicle, and means responsive to variations in the angular position of said movable wheels for varying the inflation pressures therein.

4. A motor vehicle comprising a body supported by a plurality of pneumatic wheels, one of said wheels being upon one side of said body, means for maintaining the fluid pressures in said wheels at a predetermined value during the operation of said vehicle upon a straight road, and means for increasing the inflation pressure of said wheel on one side of said vehicle automatically upon said vehicle turning a curve toward the opposite side thereof from that on which said wheel is located.

5. A motor vehicle comprising a body supported by a plurality of pneumatic wheels, one of said wheels being on one side of said body, means for maintaining said wheel at a predetermined inflation pressure during the operation of said vehicle upon a straight road and means for decreasing the inflation pressure of said wheel automatically said vehicle turns a curve toward the direction on which side of said vehicle said wheel is located.

6. A motor vehicle comprising a body supported by a plurality of pneumatic wheels, a steering mechanism for said vehicle for controlling the angular position of certain of said wheels, a valve cooperatively associated with said certain wheels for supplying fluid at different pressures for the inflation thereof, and means responsive to the operation of said steering mechanism for controlling said valve.

7. A motor vehicle comprising a body having a pneumatic wheel on each side thereof, means for decreasing the fluid pressure in one of said wheels and for increasing the fluid pressure of the other, upon directing the vehicle around a curve, and means for equalizing the pressures in said wheels upon directing said vehicle out of said curve.

8. A motor vehicle comprising a body supported by a plurality of pneumatic wheels, a source of fluid at relatively high pressure associated with said vehicle during the movement thereof, a plurality of valves for reducing the pressure of said fluid to a plurality of different values and means for selectively connecting the wheels of said vehicle to said valves upon directing the vehicle towards a path of travel substantially varying from a straight line.

9. A motor vehicle comprising a body supported by a plurality of pneumatic tires, and means for varying the pressures in said tires in response to variations in vehicle speed.

10. A motor vehicle comprising a body supported by a plurality of pneumatic wheels, speed responsive means for varying the pressures in said wheels during vehicle operation and means under the control of the vehicle operator for varying the effect of said speed responsive means.

11. In combination with a motor vehicle having a pair of front and a pair of rear pneumatic tires, pressure supply means, and means connecting the first mentioned means and said tires automatically actuatable in response to variations in the speed of said vehicle to vary the pressure in said tires.

12. In combination with a motor vehicle having a pair of front and a pair of rear pneumatic tires, pressure supply means, and means connecting the pressure supply means and said tires automatically actuatable to vary the pressure in said tires on one side of said vehicle relative to the pressure in the tires on the other side thereof upon directing said vehicle substantially out of a straight path of travel and for simultaneously varying the pressures in all of said tires in response to changes in the speed of said vehicle.

13. In combination with a motor vehicle having a pair of front and a pair of rear pneumatic tires, pressure supply means, and means connecting the first mentioned means and said tires automatically actuatable to increase the pressure in said tires upon an increase in the speed of said vehicle and to decrease the pressure in said tires upon a decrease in the speed of said vehicle.

14. In combination with a motor vehicle having a pair of front and a pair of rear pneumatic tires, pressure supply means, and means connecting the first mentioned means and said tires automatically actuatable to effect a relative increase in the air pressure in the outer of said tires and to effect a relative decrease in the air pressure in the inner of said tires when the direction of travel of said vehicle is materially altered from an approximately straight path.

15. A motor vehicle comprising a body supported by a plurality of inflated wheels, a source of fluid pressure, conduits connecting said wheels with said source of pressure, valvular means associated with said conduits for controlling the fluid pressure in said wheels, and means responsive to variations in the speed of said vehicle for controlling said valvular means to vary the pressures in said wheels during the operation of said vehicle.

WILLIAM B. STOUT.